(12) United States Patent
Mason (10) Patent No.: US 12,179,865 B2
(45) Date of Patent: *Dec. 31, 2024

(54) REINFORCEMENT SPLINT FOR VEHICLE STEERING TIE ROD

(71) Applicant: BroncBuster LLC, Fischer, TX (US)

(72) Inventor: Tyler Mason, Fischer, TX (US)

(73) Assignee: BroncBuster LLC, Fischer, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/112,476

(22) Filed: Feb. 21, 2023

(65) Prior Publication Data

US 2023/0331296 A1    Oct. 19, 2023

Related U.S. Application Data

(63) Continuation of application No. 17/894,100, filed on Aug. 23, 2022, now Pat. No. 11,584,434.

(60) Provisional application No. 63/298,902, filed on Jan. 12, 2022.

(51) Int. Cl.
*B62D 7/20* (2006.01)

(52) U.S. Cl.
CPC ..................... *B62D 7/20* (2013.01)

(58) Field of Classification Search
CPC .. B62D 7/20; B62D 7/228; B60G 2204/4308; B60G 2206/111; B60G 2206/911
See application file for complete search history.

(56) References Cited

U.S. PATENT DOCUMENTS

| | | | | |
|---|---|---|---|---|
| 2,734,760 | A * | 2/1956 | Marquis et al. | A01B 69/00 403/56 |
| 3,938,822 | A * | 2/1976 | Guerriero | B62D 7/20 403/44 |
| 4,902,158 | A | 2/1990 | Broszat et al. | |
| 5,121,808 | A * | 6/1992 | Visentini | B62D 7/20 301/128 |
| 5,505,106 | A | 4/1996 | Herman | |
| 5,603,583 | A | 2/1997 | Jackson | |
| 6,561,723 | B2 | 5/2003 | McCurdy et al. | |
| 6,579,025 | B1 | 6/2003 | Sokolihs et al. | |
| 7,182,544 | B2 | 2/2007 | Irrer | |
| 7,416,198 | B2 * | 8/2008 | Blaszynski | B62D 7/228 280/93.511 |
| 7,850,178 | B2 * | 12/2010 | Fischer | B60G 7/003 280/86.758 |

(Continued)

*Primary Examiner* — Frank B Vanaman
(74) *Attorney, Agent, or Firm* — Outlier Patent Attorneys, PLLC (57) ABSTRACT

A tie rod reinforcement device for reinforcing a vehicle steering tie rod assembly includes a metal brace assembly that reinforces a threaded section of the vehicle steering tie rod assembly. The brace assembly includes an outer surface and an inner cavity having an inner surface. Portions of the inner and outer tie rods are disposed in the inner cavity when the brace assembly is installed on a vehicle. The inner surface of the brace assembly includes a first portion having a first diameter and a second portion having a second diameter different from the first diameter. The first diameter and second diameter are about equal to an outer diameter of the inner tie rod and outer tie rod, respectively, so that the inner surface is in direct contact with the inner tie rod and outer tie rod when the apparatus is installed on the vehicle.

6 Claims, 6 Drawing Sheets

(56) References Cited

U.S. PATENT DOCUMENTS

| | | | |
|---|---|---|---|
| 8,702,112 B1* | 4/2014 | Belleau | B62D 7/20 |
| | | | 403/306 |
| 10,647,156 B2 | 5/2020 | Shakal et al. | |
| 2007/0249453 A1 | 10/2007 | Sugitani | |
| 2012/0003032 A1 | 1/2012 | Rump et al. | |
| 2014/0291953 A1* | 10/2014 | Messenger | B62D 7/228 |
| | | | 267/141 |
| 2019/0126982 A1* | 5/2019 | Boyd | B62D 7/20 |
| 2020/0238776 A1* | 7/2020 | Kishida | F16C 33/103 |

* cited by examiner

REINFORCEMENT SPLINT FOR VEHICLE STEERING TIE ROD

CROSS-REFERENCE TO RELATED APPLICATIONS

This application is a continuation application of U.S. Non-Provisional patent application Ser. No. 17/894,100 filed on Aug. 23, 2022, which claims priority to U.S. Provisional Patent Application No. 63/298,902 filed on Jan. 12, 2022, the contents of which are hereby incorporated herein by reference.

BACKGROUND

Field of the Art

This disclosure relates to reinforcing a vehicle steering component that is known to be the most susceptible to breakdown under high stress driving scenarios such as off-road driving. More specifically, in one exemplary embodiment, a pair of metal shells is clamped on the tie rod to serve as a reinforcement splint for the threaded component of the inner tie rod end, which is the component of the tie rod assembly that is most vulnerable to breaking under stress conditions caused by activities such as off-roading.

Discussion of the State of the Art

Modern higher speed vehicles typically incorporate some form of an independent front suspension (IFS) system in which each wheel or ski on the front axle is independently supported so that wheel or ski can independently respond to bumps, ruts, and surface inconsistencies, rather than mounting a vehicle chassis on a rigid axle. Front wheel steering on such vehicles is possible by using a steering system that includes tie rods that connect wheel or ski components for directional control with the steering mechanism such as a wheel or handlebars.

Manufacturers have carefully designed steering systems to safely handle typical vehicle driving but components can fail under stressful conditions such as impacts from accidents or off-road activities. The steering tie rods are among the more vulnerable steering components under stressful conditions, such as off-road driving scenarios, that can stress the vehicle's steering system.

Figure 1:
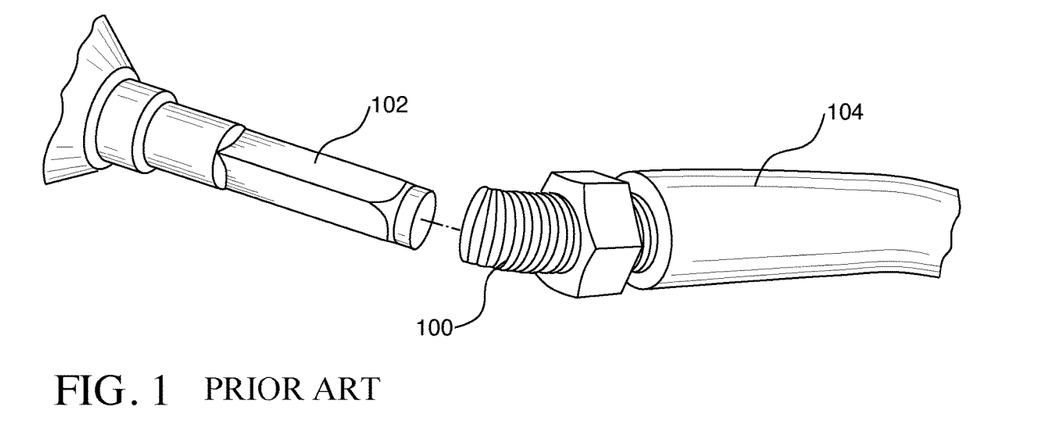
FIG. 1 illustrates an exemplary tie rod failure as being a failure of the threaded component of the tie rod assembly.

As exemplarily shown in FIG. 1, the most typical failure of a vehicle tie rod, and the part most vulnerable to failure by reason that it has the smallest cross-sectional area, is the threaded component 100 of the inner tie rod end 102 that connects the inner tie rod end 102 to the outer tie rod end 104. The only practical remedy for such failures is the replacement of at least one of the tie rod ends in the broken assembly.

Figure 2:
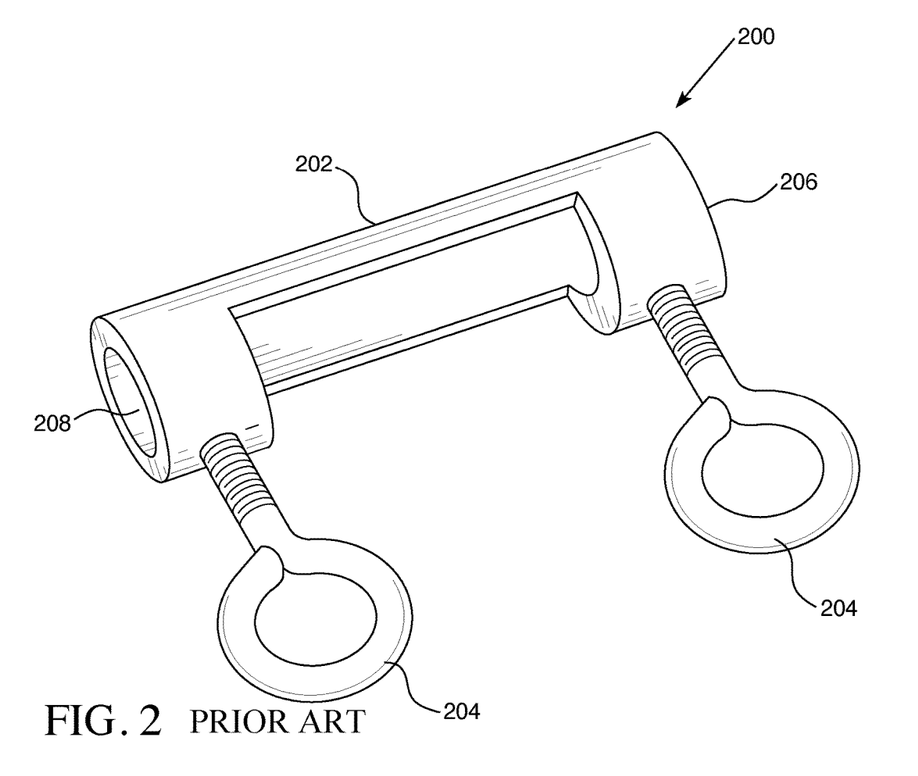
FIG. 2 illustrates a conventional product available to assist in recovery operations in moving a vehicle following a failure of its tie rod assembly.

FIG. 2 shows a commercially available product 200 that is advertised as useful in a recovery response to broken tie rods. This product 200 is a coupler 202 made from aluminum and is about 5½ inches in length. It includes two eye bolts 204 that secure the coupler 202 to a broken tie rod after slipping the two ends of the broken tie rod into opposite ends 206, 208 of the coupler 202 and then hand tightening or using a small leverage bar to tighten the two eye bolts 204. The coupler 202 can thereby serve as a temporary patch to save tow drivers time by temporarily fixing wheel alignments for easier loading and unloading of a damaged vehicle. It also allows mechanics to steer a damaged vehicle more easily to a repair bay. This product comes with a warning that it should not be used at speeds over 5 mph or for distances over 100 yards.

The present invention has evolved from first-hand experience of the broken tie rod failure shown in FIG. 1 during an off-road event. By providing a reinforcing brace for this failure point, the invention provides a solution that is intended to prevent broken tie rods under stressful driving scenarios such as off-roading, rather than providing a temporary patch once damage has occurred, as demonstrated by the coupler 202 shown in FIG. 2.

SUMMARY

In one exemplary embodiment, the present invention provides a tie rod splint that reinforces the vulnerable threaded component of a tie rod assembly, as intended to prevent the fracturing of a tie rod threaded component under stressful conditions that would typically cause a tie rod assembly to fail. As will be understood shortly, the tie rod splint is also very easy to mount on an existing vehicle, thereby providing a tie rod reinforcement with little effort by the vehicle owner.

By providing a mechanism that reinforces the most vulnerable component of the front steering system, the present invention fills a need felt by many off-road aficionados since it provides a measure of prevention against a concern well recognized in this hobby.

Additionally, this provides a solution that can be mounted onto the existing steering components without any modification of the original, factory-supplied components. Therefore, because no modifications are necessary, the incorporation of the present invention would not affect or void any manufacturers' warranties.

Moreover, although the present invention was developed for specific vehicle brands, such as the Bronco®, often used in off-roading, it is applicable to any other vehicle brand and off road vehicle that utilizes tie rods within the steering system such as a snowmobile, by machining the cavity of the splint to accommodate specific dimensions of tie rod assemblies on that brand or type of vehicle.

In one embodiment, the invention is directed to an apparatus for reinforcing a vehicle steering tie rod assembly. The tie rod assembly comprises an inner tie rod, an outer tie rod, a threaded section, and a jam nut. The apparatus includes a brace assembly comprising an outer surface and an inner cavity having an inner surface. The brace assembly is made of a rigid material. The rigid material may include at least one of: stainless steel, aluminum, and aluminum alloy. The brace assembly is sized and shaped so that a portion of the inner tie rod and a portion of the outer tie rod are disposed in the inner cavity when the brace assembly is installed on a vehicle. The inner surface comprises a first portion having a first diameter that is substantially equal to an outer diameter of the inner tie rod so that the first portion of the inner surface is in direct contact with the inner tie rod when the apparatus is installed on the vehicle. The inner surface also includes a second portion having a second diameter different from the first diameter, wherein the second diameter is substantially equal to an outer diameter of the outer tie rod so that the second portion of the inner surface is in direct contact with the outer tie rod when the apparatus is installed on the vehicle. The inner surface may also include a third portion having a third diameter that is greater than an outer diameter of the threaded section so that there is a gap between the threaded section of the tie rod assembly and the third portion of the inner surface of the brace assembly. The third diameter may be greater than an outer diameter of the jam nut.

The brace assembly may include an upper shell, a lower shell, and an attachment mechanism for coupling the upper shell to the lower shell. The attachment mechanism may include a plurality of clamping screws. The lower shell may include a plurality of through holes. The upper shell may include a respective plurality of threaded openings, and the attachment mechanism may include a respective plurality of screws configured for passing through the through holes and being coupled to the threaded openings when the upper shell and lower shell are coupled together. The upper shell may include a first half of the inner cavity and the lower shell may include a second half of the inner cavity so that the inner cavity is formed when the upper shell and the lower shell are coupled together. The brace assembly may be sized and shaped so that the upper shell and the lower shell are separated by a gap having a predetermined width when the upper shell and lower shell are clamped onto the tie rod assembly.

In another embodiment, the present invention is directed to a method of reinforcing a vehicle steering tie rod assembly. The tie rod assembly comprises an inner tie rod, an outer tie rod, a threaded section, and a jam nut. The method includes attaching a metal brace assembly to the vehicle steering tie rod assembly. The metal brace assembly is attached to a portion of the inner tie rod and a portion of the outer tie rod so that the threaded section and the jam nut are disposed in an inner cavity of the metal brace assembly. The metal brace assembly may include an upper shell and a lower shell. Attaching the metal brace assembly includes clamping the upper shell to the lower shell with the vehicle steering tie rod assembly disposed therebetween. Clamping the upper shell to the lower shell may include using a plurality of clamping screws or bolts to attach the upper shell and the lower shell together.

BRIEF DESCRIPTION OF THE DRAWING FIGURES

The accompanying drawings illustrate several embodiments and, together with the description, serve to explain the principles of the invention according to the embodiments. It will be appreciated by one skilled in the art that the particular arrangements illustrated in the drawings are merely exemplary and are not to be considered as limiting of the scope of the invention or the claims herein in any way.

DETAILED DESCRIPTION

The present invention is a brace assembly that reinforces tie rods to help prevent tie rod failures even under stressful driving such as occurs during off-roading. The brace assembly includes an outer surface and an inner cavity. A portion of the inner tie rod and a portion of the outer tie rod are disposed in the inner cavity when the brace assembly is installed on a vehicle. The inner surface of the inner cavity has an inner diameter that mimics the outer diameter of the tie rod assembly. In one embodiment, the inner cavity is sized and shaped to form a gap around the threaded portion and/or the jam nut of the tie rod assembly when the brace assembly is installed on a vehicle.

The invention is described by reference to various elements herein. It should be noted, however, that although the various elements of the inventive apparatus are described separately below, the elements need not necessarily be separate. The various embodiments may be interconnected and may be cut out of a singular block or mold. The variety of different ways of forming an inventive apparatus, in accordance with the disclosure herein, may be varied without departing from the scope of the invention.

Generally, one or more different embodiments may be described in the present application. Further, for one or more of the embodiments described herein, numerous alternative arrangements may be described; it should be appreciated that these are presented for illustrative purposes only and are not limiting of the embodiments contained herein or the claims presented herein in any way. One or more of the arrangements may be widely applicable to numerous embodiments, as may be readily apparent from the disclosure. In general, arrangements are described in sufficient detail to enable those skilled in the art to practice one or more of the embodiments, and it should be appreciated that other arrangements may be utilized and that structural changes may be made without departing from the scope of the embodiments. Particular features of one or more of the embodiments described herein may be described with reference to one or more particular embodiments or figures that form a part of the present disclosure, and in which are shown, by way of illustration, specific arrangements of one or more of the aspects. It should be appreciated, however, that such features are not limited to usage in the one or more particular embodiments or figures with reference to which they are described. The present disclosure is neither a literal description of all arrangements of one or more of the embodiments nor a listing of features of one or more of the embodiments that must be present in all arrangements.

Headings of sections provided in this patent application and the title of this patent application are for convenience only and are not to be taken as limiting the disclosure in any way.

Devices and parts that are connected to each other need not be in continuous connection with each other, unless expressly specified otherwise. In addition, devices and parts that are connected with each other may be connected directly or indirectly through one or more connection means or intermediaries.

A description of an aspect with several components in connection with each other does not imply that all such components are required. To the contrary, a variety of optional components may be described to illustrate a wide variety of possible embodiments and in order to more fully illustrate one or more embodiments. Similarly, although process steps, method steps, or the like may be described in a sequential order, such processes and methods may generally be configured to work in alternate orders, unless specifically stated to the contrary. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the embodiments, and does not imply that the illustrated process is preferred. Also, steps are generally described once per aspect, but this does not mean they must occur once, or that they may only occur once each time a process or method is carried out or executed. Some steps may be omitted in some embodiments or some occurrences, or some steps may be executed more than once in a given aspect or occurrence.

When a single device or article is described herein, it will be readily apparent that more than one device or article may be used in place of a single device or article. Similarly, where more than one device or article is described herein, it will be readily apparent that a single device or article may be used in place of more than one device or article.

The functionality or the features of a device may be alternatively embodied by one or more other devices that are not explicitly described as having such functionality or features. Thus, other embodiments need not include the device itself.

Techniques and mechanisms described or referenced herein will sometimes be described in singular form for clarity. However, it should be appreciated that particular embodiments may include multiple iterations of a technique or multiple instantiations of a mechanism unless noted otherwise. Alternate implementations are included within the scope of various embodiments in which, for example, functions may be executed out of order from that shown or discussed, including substantially concurrently or in reverse order, depending on the functionality involved, as would be understood by those having ordinary skill in the art.

Overview

The apparatus of the present invention is easily installed on a vehicle tie rod assembly to provide reinforcement of the most vulnerable part of the tie rod assembly. Because no modifications of the original steering components are needed to install the present invention, there is no effect on warranties of the original steering components. The apparatus of the present invention is a brace assembly that clamps onto the tie rod assembly of the vehicle. In particular, the brace assembly clamps onto the portion of the tie rod assembly that includes the junction between the outer tie rod and the inner tie rod. As such, a portion of the outer tie rod, a portion of the inner tie rod, the threaded portion, and the jam nut are disposed within the brace assembly when the brace assembly is installed on the vehicle.

Apparatus

Figure 3:
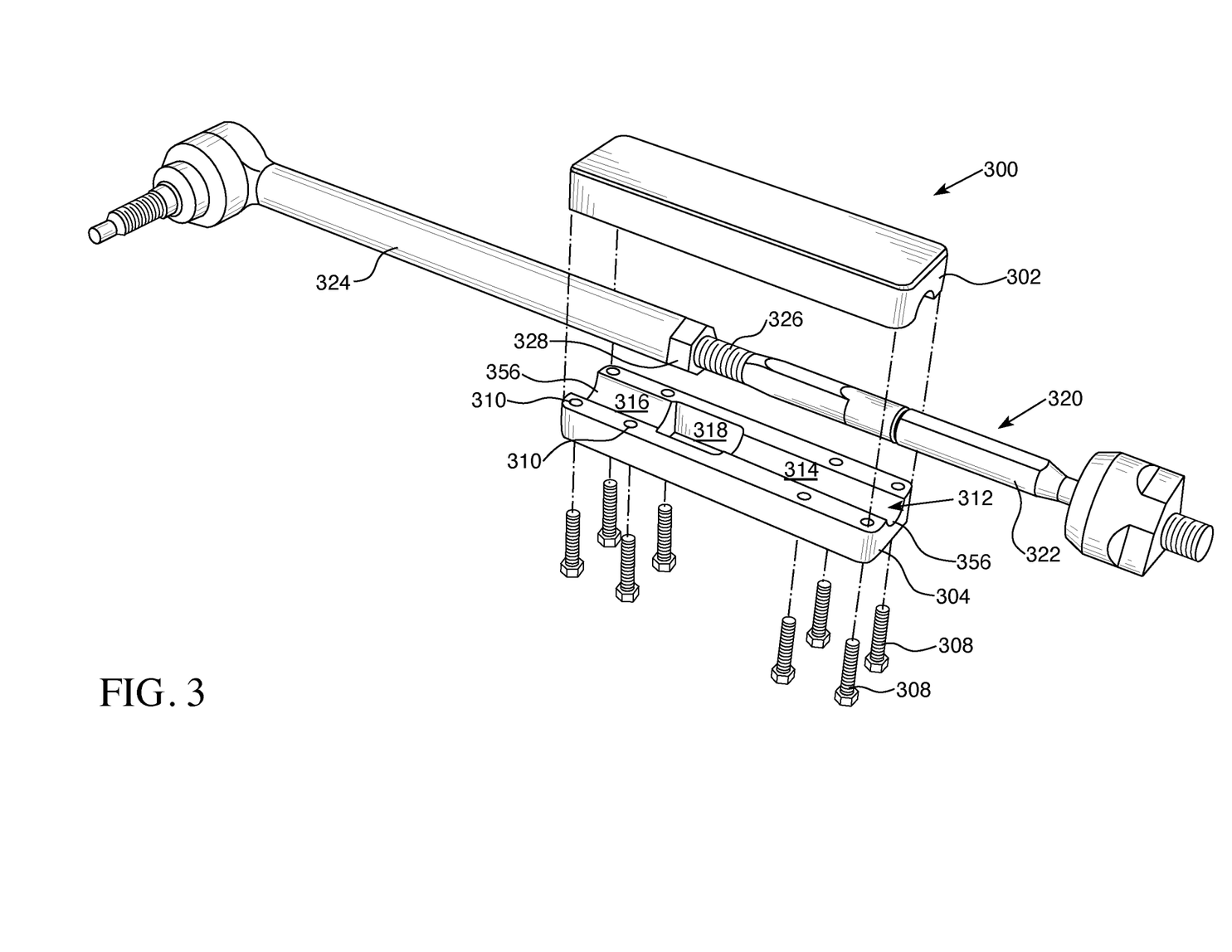
FIG. 3 is an exploded view of a brace assembly in accordance with an embodiment of the present invention.

FIG. 3 illustrates an exploded view of the invention in accordance with one exemplary embodiment. In particular, FIG. 3 illustrates a brace assembly 300 that is configured for reinforcing a vehicle steering tie rod assembly 320. The vehicle steering tie rod assembly 320 includes an inner tie rod 322, an outer tie rod 324, a threaded section 326, and a jam nut 328. The brace assembly 300 includes an upper shell 302 and a lower shell 304 that are clamped together over a portion of the inner tie rod 322, a portion of the outer tie rod 324, the threaded section 326, and the jam nut 328. The upper shell 302 and the lower shell 304 are clamped together exemplarily using eight screws 308 that correspond with matching dead end screw holes (not shown) on the upper shell 302. The upper shell 302 and lower shell 304 are mirror images of each other except for the minor difference that the lower shell 304 has through holes 310 for the clamping screws 308 and the upper shell 302 has corresponding threaded openings. In an exemplary embodiment, the upper shell 302 and lower shell 304 are made of stainless steel and the internal cavities are machined out corresponding to specific dimensions and tolerances of the tie rod assembly 320 of a targeted specific vehicle brand or type. However, other materials such as aluminum or aluminum alloy and other machining processes such as metal stamping could also be used to provide the splint shell components. It should be clear that, once the upper shell 302 and lower shell 304 are clamped together under a specified torque on the screws 308, the brace assembly 30) will provide a reinforcement splint for the tie rod threaded component 326.

It should also be clear that the number of clamping screws 308 shown in FIG. 3 are exemplary only and are not limiting to the invention. Additionally, the specific method of clamping the upper and lower shells 302, 304 are also exemplary only and not limiting to the invention. That is, although the use of hex screws or bolts 308 inserted into through holes 310 in the lower shell 304 and screwed into matching dead end threaded holes in the upper shell 302 is a preferred method of clamping the two shells together because it provides a neat, finished appearance, other methods could be used such as nuts and bolts threaded through matching through holes on both the upper and lower shells 302, 304. An important aspect of the splint assembly 300 is that the two halves of the splint assembly 300 can clamp securely onto the inner tie rod 322 and the outer tie rod 324 to provide a reinforcement splint for the more vulnerable threaded component 326.

The brace assembly 300 includes an internal cavity 312 that is formed when the upper shell 302 and the lower shell 304 are clamped together. The internal cavity 312 is sized and shaped to contain a portion of the inner tie rod 322, a portion of the outer tie rod 324, and the threaded portion 326 of the tie rod assembly 320. Half of the inner cavity 312 is shown in FIG. 3. In particular, the half of the inner cavity 312 that is formed by the lower shell 304 can be seen in FIG. 3. The other half of the inner cavity 312 is formed by the upper shell 302 and is a mirror image of the lower half of the inner cavity 312 shown in FIG. 3.

The inner cavity 312 includes a first portion 314 having a diameter that is substantially equal to the outer diameter of the inner tie rod 322, and a second portion 316 that is substantially equal to the outer diameter of the outer tie rod 324. In other words, the diameter of the inner cavity 312 is only slightly larger than (or "substantially equal to") the outer diameter of the tie rod assembly 320. The diameter of the inner cavity 312 is only a few mils (e.g., 1 to 5 mils) larger than the outer diameter of the tie rod assembly 320, and thus is "substantially equal to" the outer diameter of the tie rod assembly 320. Due to this tight tolerance, the outer tie rod 324 and the inner tie rod 322 are in a fixed position relative to the brace assembly 300. The inner cavity 312 of the brace assembly 300 may also include a third portion 318 having a diameter greater than the outer diameters of the jam nut 328 and the threaded portion 326.

Figure 4:
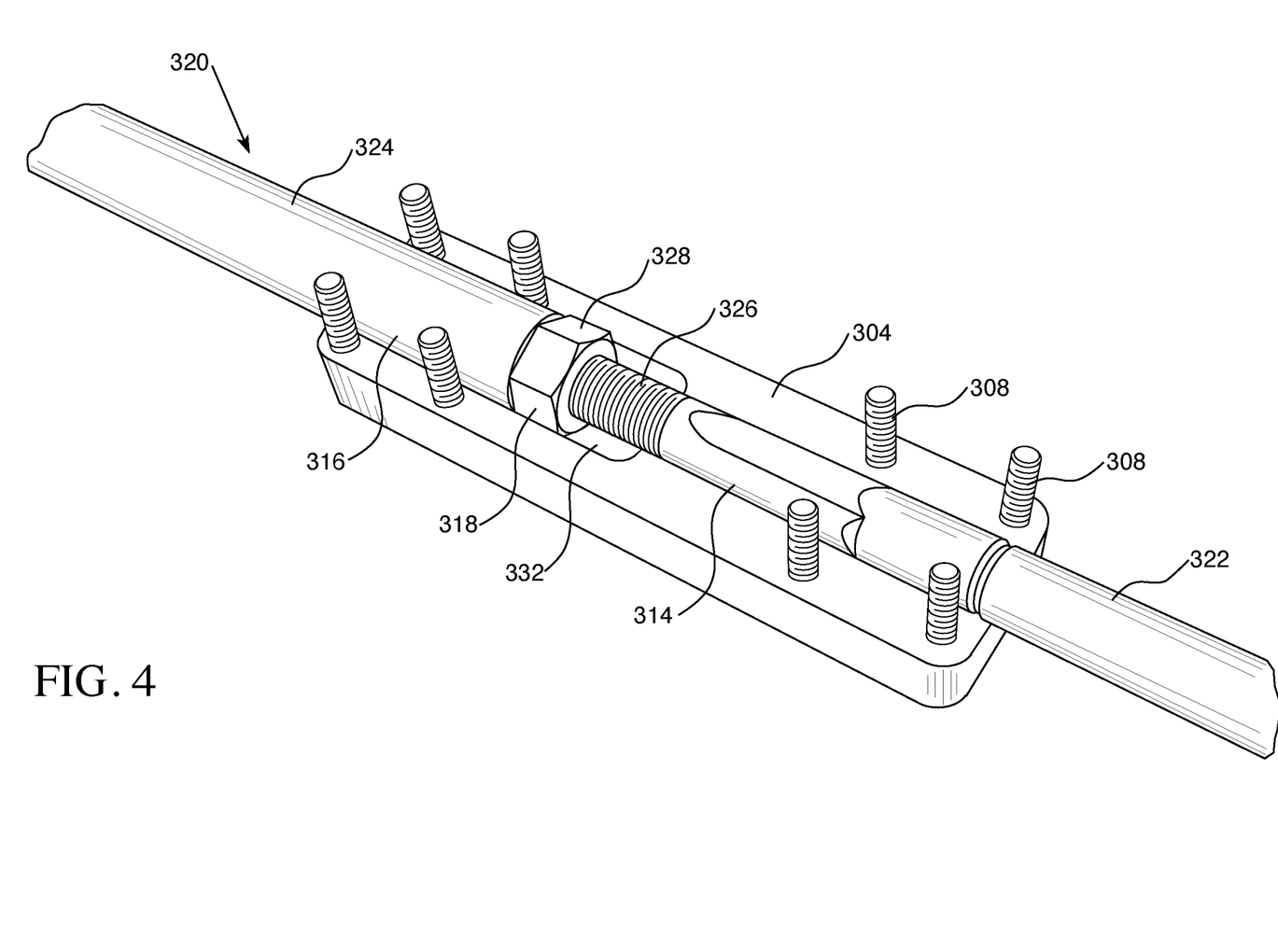
FIG. 4 is a perspective view of a lower shell of a brace assembly with a tie rod assembly disposed therein, in accordance with an embodiment of the present invention.

FIG. 4 illustrates how the tie rod assembly 320, including its threaded component 326, fits into the internal cavity 312 of the brace assembly 300. In particular, FIG. 4 illustrates how the tie rod assembly 320 fits into the lower shell 304 of the brace assembly 300. It is noted that the cavity 312 includes a gap 332 around the threaded component 326 that accommodates the nut 328 used to adjust the length of the tie rod assembly 320 for wheel or ski alignments. This enlarged gap 332 permits the splint to be removed from the tie rod assembly 320 for the purpose of adjusting tie rod length and then remounted and re-clamped at the revised tie rod length.

In another embodiment (not shown), this gap may be eliminated. In other words, the inner cavity 312 does not include the third portion 318 in this embodiment. Rather, the inner cavity 312 only includes the first portion 314 having a diameter substantially equal to the outer diameter of the inner tie rod 322 and the second portion 316 having a diameter substantially equal to the outer diameter of the outer tie rod 324. The inner diameter of the inner cavity 312 mimics the outer diameter of the tie rod assembly 320 so that the inner diameter of the inner cavity 312 is only a few mils larger than the outer diameter of the tie rod assembly 320. This tight tolerance between the brace assembly 300 and the tie rod assembly 320 provides sufficient reinforcement to the threaded portion 326 of the tie rod assembly 320.

Figure 5:
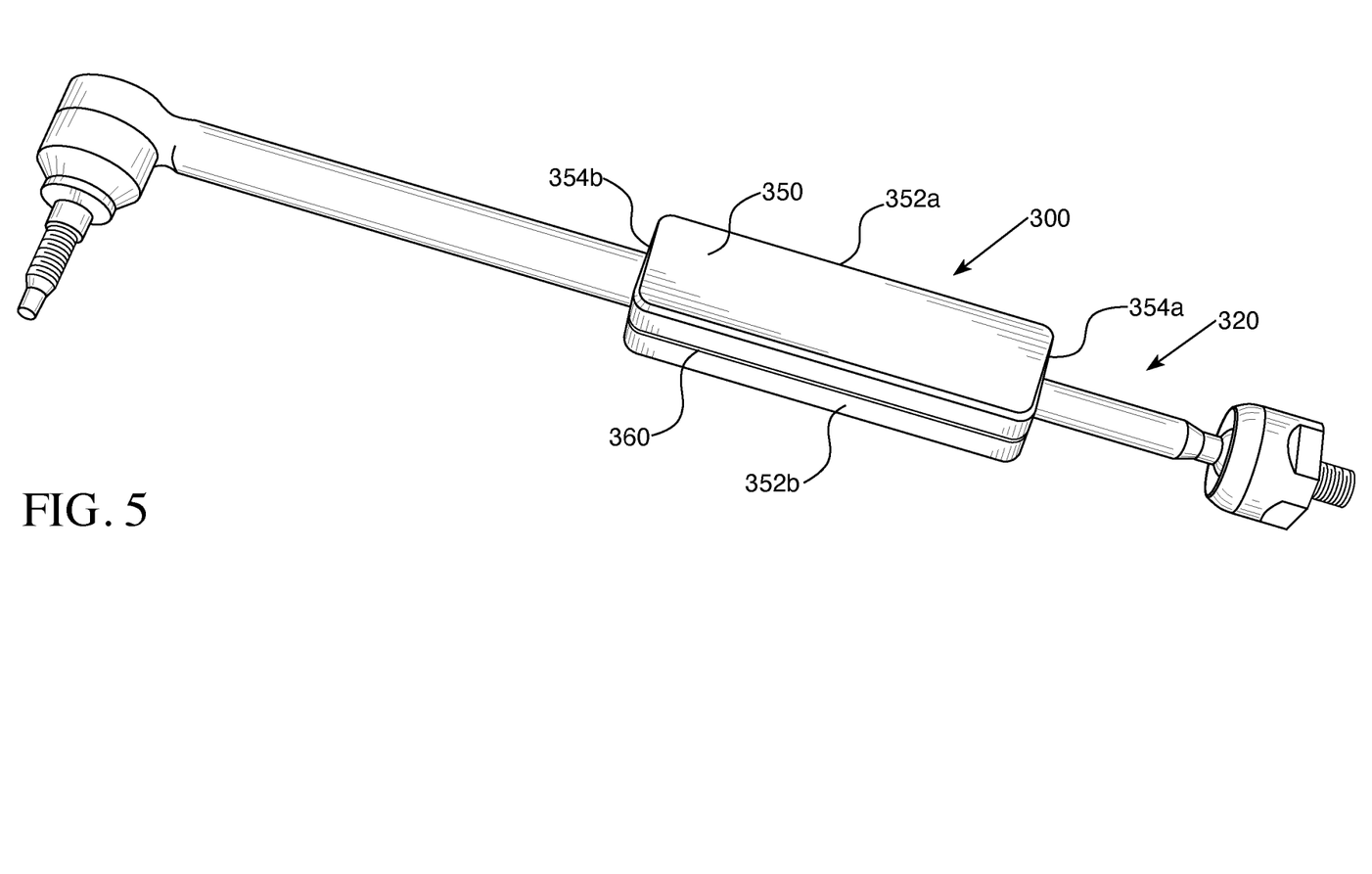
FIG. 5 is a front elevation view of a brace assembly installed on a tie rod assembly, in accordance with an embodiment of the present invention.
Figure 6:
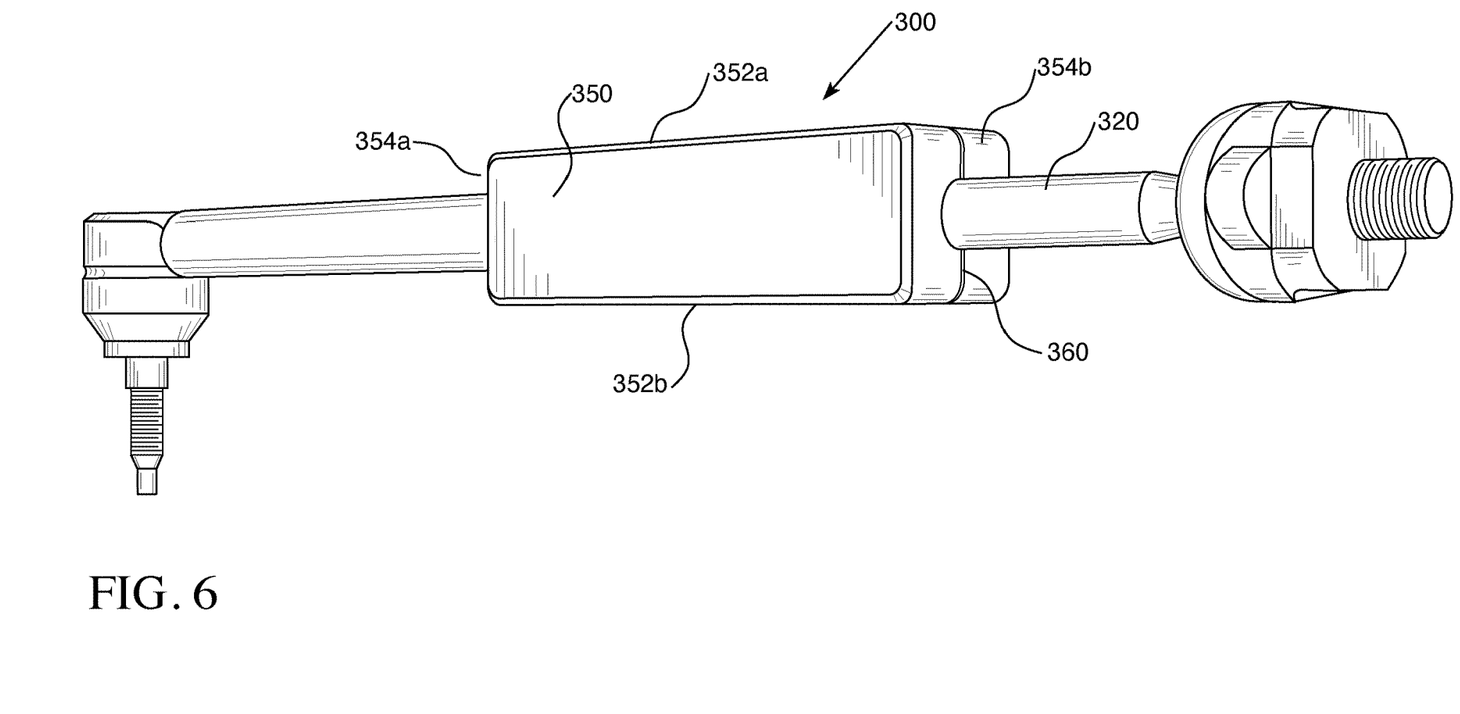
FIG. 6 is a perspective view of a brace assembly installed on a tie rod assembly, in accordance with an embodiment of the present invention.

FIGS. 5 and 6 show the preferred exemplary embodiment as installed on the tie rod assembly 320 and demonstrate how the splint 300 can fit into an existing steering configuration in a very complimentary manner with a finished appearance. The splint 300 includes an outer surface 350 having a first side 352*a*, a second side 352*b*, a first end 354*a*, and a second end 354*b*. The first end 354*a* and the second end 354*b* include openings 356 (shown in FIG. 3) that surround the tie assembly 320. As shown in FIGS. 5 and 6, there is a gap 360 between the upper shell 302 and lower shell 304 once the two shells 302, 304 are clamped together with a predetermined torque on the clamping screws or bolts, as determined based on the materials used for the clamping screws/bolts and for the splint components. The tolerance of this gap 360 is important in ensuring that the tie rod 320 is securely clamped between the shells 302, 304. In an exemplary prototype embodiment, this gap 360 was set at approximately one millimeter (1 mm), but it will be readily appreciated by one of ordinary skill in the art that the invention is not limited to a 1 mm gap. Rather, the gap 360 may be less than or greater than 1 mm.

Figure 7A:
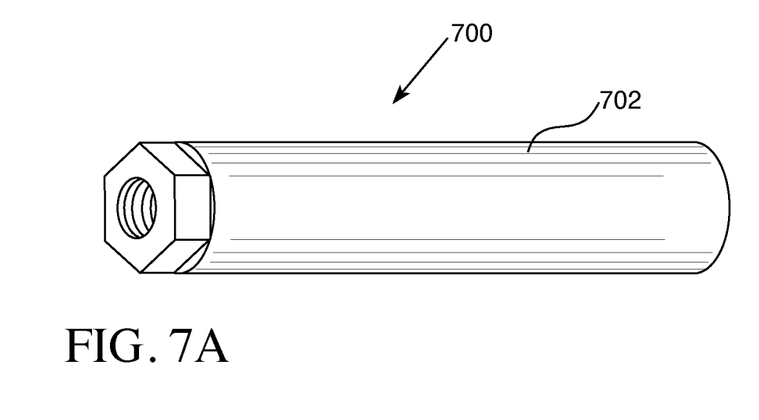
FIGS. 7A and 7B are perspective and cross-sectional views, respectively, of an alternate exemplary embodiment that demonstrates another structure that can perform a key feature of the invention of reinforcement of the threaded component on a tie rod assembly.
Figure 7B:
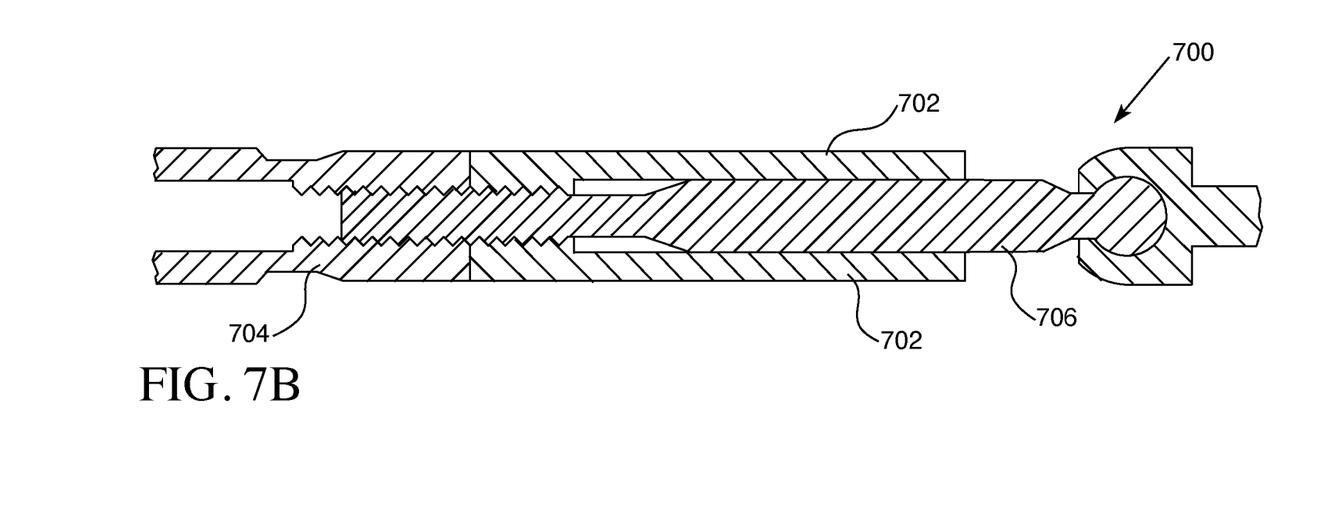

FIGS. 7A and 7B illustrate a second exemplary embodiment 700 that provides a similar function of reinforcing the threaded component of a conventional tie rod assembly. In this exemplary embodiment, a sleeve 702 that replaces the adjustment nut of the steering tie rod provides a reinforcement of the threaded component of the tie rod 704, 706, as demonstrated in the cross-sectional view of FIG. 7B. By abutting the nut end of the sleeve 702 firmly against the nut end 704 of the tie rod assembly, the sleeve 702 serves to reinforce the threaded section of the tie rod assembly, which is the section most vulnerable to damage due to having the threads that provide the smallest cross-sectional area. The sleeve 702 can be made of any suitable metal such as stainless steel or an aluminum or aluminum alloy.

Thus, the two exemplary embodiments shown in FIG. 3 and FIGS. 7A and 7B can be viewed as having a common characteristic in which a metal component is shaped to surround and provide bracing to the weakest section of a tie rod assembly, which is the threaded section in which threads provide the smallest cross-sectional area of the tie rod assembly.

Since tolerances are important in the two exemplary embodiments of the invention and since tie rod designs vary between different vehicle brands and models, it should be clear that these two embodiments would have to be specifically designed for each vehicle brand and model and would not necessarily be interchangeable across vehicle brands and models.

Either embodiment of the invention could be implemented as a kit of parts in which a user receives the components for installation into an existing vehicle tie rod assembly.

Additional Considerations

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process for creating an interactive message through the disclosed principles herein. Thus, while particular embodiments and applications have been illustrated and described, it is to be understood that the disclosed embodiments are not limited to the precise construction and components disclosed herein. Various apparent modifications, changes and variations may be made in the arrangement, operation and details of the method and apparatus disclosed herein without departing from the spirit and scope defined in the appended claims.

What is claimed is:

1. A brace assembly for reinforcing a vehicle steering tie rod assembly, wherein the tie rod assembly comprises an inner tie rod, an outer tie rod, a threaded section, and a jam nut, the brace assembly comprising:
an upper shell;
a lower shell; and
an attachment mechanism for removably coupling the upper shell and the lower shell together to create an inner cavity having an inner surface,
wherein the upper shell and the lower shell are sized and shaped so that, when the brace assembly is installed on the vehicle steering tie rod assembly, the inner surface is in direct contact with the inner tie rod and the outer tie rod, and
wherein the inner surface comprises a first portion having a first inner diameter and a second portion having a second inner diameter different from the first inner diameter.

2. The brace assembly of claim 1, wherein, when the brace assembly is installed on the vehicle steering tie rod assembly, there is a gap between the upper shell and the lower shell.

3. The brace assembly of claim 1, wherein the upper shell and the lower shell are made of a rigid material.

4. The brace assembly of claim 1, wherein the upper shell and the lower shell are made of metal.

5. The brace assembly of claim 1, wherein the first inner diameter is substantially equal to an outer diameter of the inner tie rod, and wherein the second inner diameter is substantially equal to an outer diameter of the outer tie rod.

6. The brace assembly of claim 1, wherein the attachment mechanism comprises a plurality of screws.

* * * * *